United States Patent Office 2,996,475
Patented Aug. 15, 1961

2,996,475
HOMOGENEOUS MIXTURES COMPRISING POLY-
ESTERS AND POLYMERIC ACRYLAMIDES AND
PROCESS FOR PREPARING SAME
Frederick B. Joyner and Harry W. Coover, Jr., Kingsport, Tenn., assignors to Eastman Kodak Company, Rochester, N.Y., a corporation of New Jersey
No Drawing. Filed May 27, 1957, Ser. No. 661,583
13 Claims. (Cl. 260—45.4)

This invention relates to homogeneous mixtures of linear polyesters and resinous polyacrylamides to provide stable, uniform and readily dyeable materials and articles therefrom, and more particularly to a process for the production of these mixtures.

High-molecular-weight, fiber-forming polyesters in general are relatively insoluble, hydrophobic materials. Since they are not readily permeable to water, they cannot be dyed satisfactorily by the ordinary dyeing procedures and conventional commercial dyeing equipment. This is a marked limitation of the utility of these materials in the textile field. Therefore, it would be very desirable to improve the dyeing properties in order to increase the value of fibers, films, and other articles prepared from such polyesters.

In copending applications Serial No. 623,533, of John R. Caldwell, Russell Gilkey and Clarence C. Dannelly, filed November 21, 1956, now U.S. Patent No. 2,893,970, and Serial No. 623,534, of John R. Caldwell and Edward H. Hill, filed November 21, 1956, it is proposed to improve the dyeing properties of linear polyesters by incorporating polymeric acrylamides therein in the form of pigments, i.e. discrete particles of the polyacrylamides which retain their entities in this form throughout the processing of the compositions and the production of the final fiber products. In other words, the compositions and articles therefrom are heterogeneous systems. While certain advantages are derived from this kind of combination, some shortcomings will be apparent. For one thing, the above compositions are similar to paints in that solid particles of the pigments tend to separate out and settle when the compositions are melted or dispersed in solvents. Also articles such as fibers made therefrom are highly susceptible to disintegration by solvents and other compositions that dissolve out the linear polyesters. As to the polyacrylamides themselves, it is shown in Allewelt, U.S. Patent 2,560,680, dated July 17, 1951, that they have softening points around 180° to 265° C. and, in addition, those having the higher melting points show pronounced decomposition when heated to the fused state. Other attempts to employ polyacrylamides for improving the dyeability of difficultly dyeable synthetic polymers have not been successful because of incompatibility of the polymers. For example, it is shown in Hagemeyer, Jr. et al, U.S. Patent 2,719,138, dated September 25, 1955, that solutions of mixtures of polyacrylonitrile and polymeric amides such as polyacrylamide separate into two layers on standing.

We have now found that certain hydrophobic, linear polyesters are compatible in a definite range of proportions with a select group of polymeric acrylamides exhibiting excellent moisture absorption properties to give homogeneous compositions, that the resulting mixed compositions are inseparable under normal conditions to which textile materials are subjected to in processing and uses, and that the mixed compositions and articles prepared therefrom not only have enhanced water absorption capacities and improved physical characteristics dependent thereon, but of prime importance they are readily dyeable to uniform colors with acid and direct dyes which normally will not dye the unmodified linear polyesters. This is a surprising result in view of the aforementioned contrary teaching of the prior art.

It is, accordingly, an object of the invention to provide homogeneous mixtures of certain linear polyesters with a select group of polymeric acrylamides. Another object is to provide mixtures as above that have good stability, moisture absorption properties and excellent affinity for commercial textile dyes. Another object is to provide dyed articles from the above mixtures that show no segmentation in processing and in uses. Another object is to provide a process for preparing the above homogeneous mixtures. Other objects will become apparent hereinafter.

In accordance with the invention, we prepare homogeneous mixtures of certain polyesters and a select group of polymeric acrylamides by a number of different procedures such as (1) synthesis of the polyester from its monomeric components in the presence of the polymeric acrylamide, (2) coprecipitation of the linear polyester with the polymeric acrylamide from a suitable common solvent, and (3) addition of the polymeric acrylamide to the linear polyester melt, preferably in vacuo or under a nitrogen atmosphere. In general, the most satisfactory results are obtained in mixtures containing from 31 to 4 parts by weight of the polymeric acrylamide and from 69 to 96 parts by weight of the polyester. Compositions outside these limits result in adverse color formation and excessive decomposition of the polyester component during processing. Where the polymeric acrylamide is a copolymer, the best results are obtained with those copolymers containing at least 60 mole percent of the acrylic amide component. The preferred process for preparing the above mixtures is by the melt process designated (3) above. Homogeneous melts are readily obtained by heating a powdered mixture of the said polymers above their melting points, in the range of about from 250° to 350° C. A highly satisfactory method is to first melt the polyester and then slowly add the polymeric acrylamide with stirring until a homogeneous dope is obtained. At this stage, dyes, softeners, pigments, etc. may be added as desired. No observable decomposition of the polymeric acrylamides takes place in the above melt process even when the dopes are cooled and remelted several times. The homogeneous melted mixtures or dopes prepared as above can be spun, if desired, directly as formed into fibers or they may be extruded into pellets for storage and shipment, followed by remelting as required for shaping various articles that are characterized by being homogeneous, free from mechanical strains, and showing no segmentation defects in processing and in usage.

Suitable linear polyesters for practicing the invention include linear polyesters from 4,4'-sulfonyldibenzoic acid and glycols, i.e. straight-chain alkanediols containing from 5 to 12 carbon atoms, e.g. pentamethylene glycol and higher glycols, such as described in Caldwell, U.S. Patent 2,744,089, dated May 1, 1956; linear polyesters from 4,4'-sulfonyldibenzoic acid plus a saturated, dibasic straight-chain fatty acid containing from 2 to 20 carbon atoms, e.g. succinic, glutaric, adipic, sebacic, 1,18-octadecanedioic, etc. acids, condensed with straight-chain alkanediols containing from 2 to 12 carbon atoms, such as described in Caldwell U.S. Patent 2,744,091, dated May 1, 1956; and linear polyesters from 1,4-cyclohexanedimethanol condensed with one or more dibasic acids including terephthalic acid such as described in copending application Serial No. 554,639, of Charles J. Kibler et al., filed December 22, 1955. The above mentioned acid components are employed in the form of their alkyl esters, but since the alkyl groups are eliminated in the condensations, the linear polyesters can be said to be derived from or comprised from the respective acids and glycols. Specific linear polyesters to be mentioned for illustrative purposes include a polyester comprised from 5 moles of 4,4'-sulfonyldibenzoic acid, 1 mole of succinic acid and 6 moles of 1,5-pentanediol, a polyester comprised from 5 moles of 4,4'-sulfonyldibenzoic acid, 1 mole of terephthalic acid and 6 moles of 2,2-dimethyl-1,3-pentanediol, a polyester comprised from 5 moles of 4,4'-sulfonyldibenzoic acid, 0.3 mole of sebacic acid and 5.3 moles of 1,6-hexanediol, a polyester comprised from 1 mole of 4,4'-sulfonyldibenzoic acid and 1 mole of 1,8-octanediol, a polyester comprised from 5 moles of 4,4'-sulfonyldibenzoic acid, 1.5 moles of suberic acid and 6.5 moles of 1,4-butanediol, a polyester comprised from 3 moles of terephthalic acid, 1 mole of succinic acid and 4 moles of 1,4-cyclohexanedimethanol, polyethylene terephthalate, and the like. Accordingly, the glycol compounds are employed in such proportions that there is at least an equivalent amount of oxy substituents in proportion to the carboxy substituents in the overall combination. Also, the 4,4'-sulfonyldibenzoic acid and the terephthalic acid are present in greater amount than any other dibasic acid in their respective combinations.

Suitable polymeric acrylamides for practicing the invention include the homopolymers and copolymers of acrylamides represented by the following general formula:

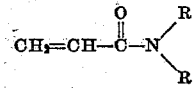

wherein each R represents the same or different members selected from the group consisting of an atom of hydrogen, an alkyl group of 1 to 12 carbon atoms, e.g. methyl, butyl, hexyl, dodecyl, etc. groups, a cyclohexyl group, a phenyl group, a benzyl group and a naphthyl group. Typical polymers coming within the above definition include polyacrylamide, poly-N-isopropylacrylamide, poly-N,N-dimethylacrylamide, poly-N-ethylacrylamide, poly-N-phenylacrylamide, poly-N-methyl-N-phenylacrylamide, poly-N-butylacrylamide, poly-N,N-diethylacrylamide, poly-N,N-dipropylacrylamide, poly-N-isobutylacrylamide, poly-N-benzylacrylamide, poly-N,N-dibutylacrylamide, poly-N-α-naphthylacrylamide, poly-N-dodecylacrylamide, etc. Copolymers composed of two or more different acrylamide units coming within the above formula can be used. Other suitable copolymers include any of the above defined acrylamides with a different polymerizable, monoethylenically unsaturated compound containing a CH$_2$=C< group such as acrylonitrile, methacrylonitrile, styrene, α-methylstyrene, vinyl chloride, vinylidene chloride, acrylic and methacrylic alkyl esters wherein the alkyl group in each instance contains 1 to 4 carbon atoms, 2-methyl-5-vinylpyridine, N-vinyl sucinimide, N-vinyl phthalimide, N-vinyl pyrrolidone, vinylidene cyanide, and the like monomers, in the proportions containing 60% or more of the acrylamide monomer. However, the homopolymeric acrylamides give the best results and are preferred, particularly the homopolymers of the N-alkyl substituted acrylamides.

The polymerizations of the above acrylamides may be carried out according to methods well known to the art, for example, employing accelerating agents such as heat, actinic light or polymerization catalysts such as peroxides, e.g. benzoyl peroxide, acetyl peroxide, tertiary butyl hydroperoxide, hydrogen peroxide, etc., persulfates e.g. sodium, potassium, ammonium persulfates, persulphuric acid, etc., alkali metal perborates or percarbonates, water-soluble salts of perphosphoric acid, etc. The organic peroxides are especially suitable. Mixtures of catalyst can be employed. The reactions may be carried out in mass, but advantageously the polymerizations are conducted in an aqueous medium, although other media such as organic solvents can be employed, for example, a polymerization medium consisting of aqueous acetone, aqueous alcohol, etc. can be used. The temperature at which the polymerizations are conducted can vary from ordinary room temperature to the reflux temperature of the reaction mixture, but preferably at from 25° to 75° C. If desired, emulsifying agents can be added to the reaction mixture to distribute the reactants throughout the mixture, for example, alkali metal salts of certain alkyl acid sulfates, e.g. sodium lauryl sulfate, alkali metal salts of aromatic sulfonic acids, e.g. sodium isobutyl-naphthalene sulfonate, alkali metal salts of fatty acids containing from 12 to 20 carbon atoms, sulfonated fatty acid amides, etc. Also chain regulators such as hexyl, octyl, lauryl, dodecyl, myristyl, etc. mercaptans can be used which impart improved solubility properties to the polymers. If desired, reducing agents such as alkali metal bisulfites, e.g. sodium, potassium, etc. bisulfites can be added to the reaction mixture to reduce the required time and temperature for effecting the polymerizations.

The following examples will serve further to illustrate the manner whereby we practice our invention.

Examples 1–9

These examples illustrate homogeneous mixtures prepared by the aforementioned process designated (1) wherein the polyester is synthesized in the presence of the preformed polymeric acrylamide.

(1) A mixture of 83.70 g. (0.2 mol.) of dibutyl 4,4'-sulfonyldibenzoate, 5.84 g. (0.04 mol.) of dimethyl succinate, 49.47 g. (0.47 mol.) of 1,5-pentanediol and 8.24 g. (equiv. to 0.063 mol. of N-tert-butylacrylamide monomer) of poly-N-tert-butylacrylamide [(η) 0.41 in dimethylformamide] was heated under an atmosphere of dry, oxygen-free nitrogen to 195° C. At this point 16 drops of a 2% solution of sodium titanium butylate in butanol was injected into the hot mixture. Ester interchange began almost immediately. The butyl alcohol formed was removed continuously by distillation. The temperature was kept at 195°–200° C. throughout the interchange reaction which required 80 mins. for completion. The temperature was then raised to 270° C. over a 27-min. period during which some of the excess 1,5-pentanediol distilled out. The pressure of the system was gradually reduced to 1.5 mm. over a 5-min. period. Heating at 265°–270° C. was continued for 2 min. more. Then, the vacuum was broken by bleeding in dry, oxygen-free nitrogen. The molten "prepolymer" was poured immediately into 500 cc. of cold water whereupon it solidified to a glassy solid. The brittle solid was drained and was ground to small particles. After drying at 50° C. in a vacuum oven for 12 hr., the prepolymer was ground to a particle size of 40 to 70 mesh. This prepolymer, which contained 4% by weight of poly-N-tert-butylacrylamide based on nitrogen analysis, was subjected to polymerization in the solid phase by heating at 220° C. under a pressure of 1.5 to 0.5 mm. for one hour. The colorless, modified polyester obtained thereby had an inherent viscosity of 1.44 in 60–40 phenol-tetrachloroethane mixture. Cast films prepared therefrom dyed well with acid dyes such as Wool Fast Blue BL (C.I. 833) and Milling Red SWG (similar to C.I. 430), in the aqueous dye bath at boil for one hour. A sample of the polyester made in similar manner, except that the poly-N-tert-butylacrylamide was omitted, showed little tendency to take up these dyes.

(2) The procedure of Example 1 was repeated using poly-N-isopropylacrylamide [(η) 1.15] instead of the poly-N-tert-butylacrylamide. The resulting modified polyester contained 0.88% by weight of nitrogen (equivalent to about 7%) and dyed well with acid dyes.

(3) The procedure of Example 1 was repeated using poly-N,N-dimethylacrylamide in place of the poly-N-tert-butylacrylamide. The modified polyester dyed readily to deep shades with acid dyes.

(4) The procedure of Example 1 was repeated using a copolymer consisting of 70 mole percent of N-isopropylacrylamide and 30 mole percent of acrylonitrile in place of the poly-N-tert-butylacrylamide. The dyeability of the modified polyester with acid dyes was excellent.

(5) A mixture of 0.2 mol. of dimethylterephthalate and 0.47 mol. of ethylene glycol was reacted in the presence of 8.24 g. of poly-N-tert-butylacrylamide by the general procedure of Example 1. The modified polyethylene terephthalate obtained was cast into films which were readily dyed with the acid wool dyes described in Example 1. A sample of polyethylene terephthalate made in a similar manner except that the poly-N-tert-butylacrylamide was omitted, showed no tendency to take up these dyes under similar conditions.

(6) A mixture of 38.84 g. (0.2 mol.) of dimethyl terephthalate, 57.68 g. (0.48 mol.) of 1,4-cyclohexanedimethanol (containing 70% trans isomer) and 5.49 g. (equivalent to 0.043 mol. of N-tert-butylacrylamide monomer) of poly-N-tert-butylacrylamide [($\eta$) 0.41 in dimethylformamide] was heated under an atmosphere of dry, oxygen-free nitrogen to 195° C. At this point, 16 drops of a 2% solution of sodium titanium butylate in butanol was injected into the hot mixture. Ester interchange began immediately. The methyl alcohol formed during the reaction was removed continuously by distillation as the temperature of the mixture was gradually raised to 280°–285° C. at a rate designed to keep the mass in a molten state. The pressure of the system was then gradually reduced to 1.5 to 0.5 mm. Heating at 280°–285° C. was continued for 2 to 3 mins. at this pressure. The vacuum was broken by bleeding in dry, oxygen-free nitrogen. The hot "prepolymer" was then extruded into 500 cc. of cold water. The brittle solid was drained and ground to small particles. After drying at 50° C. in a forced-ventilation oven for 12 hrs., the prepolymer was ground to a particle size of 40 to 70 mesh. This prepolymer contained 8.8% by weight of poly-N-tert-butylacrylamide based on the analysis for nitrogen and had an inherent viscosity of 0.44 in 60–40 phenol-tetrachloroethane. The prepolymer was subjected to polymerization in the solid phase by heating at 240° C. under a pressure of 1.5 to 0.5 mm. for 1.5 hrs. The product was essentially a homogeneous mixture of polycyclohexylenedimethylene terephthalate and poly-N-tert-butylacrylamide. It was colorless and had an inherent viscosity of 1.52 in 60–40 phenol-tetrachloroethane. Films prepared therefrom dyed to deep shades with acid dyes such as mentioned in Example 1, in the aqueous dye baths at boil for one hour. In comparison with the above results, a sample of polyester prepared in the same manner, except that no polymeric acrylamide was used, showed little tendency to take up these dyes.

(7) The procedure of Example 6 was repeated using poly-N-isopropylacrylamide [($\eta$) 1.15] instead of the poly-N-tert-butylacrylamide. The resulting modified polyester contained 16% by weight of poly-N-isopropylacrylamide based on the analysis for nitrogen. Films prepared therefrom dyed to deep shades with acid dyes.

(8) The procedure of Example 6 was repeated using poly-N,N-dimethylacrylamide instead of the poly-N-tert-butylacrylamide. The resulting modified polyester contained 21% by weight of poly-N,N-dimethylacrylamide and showed excellent dyeability.

(9) A mixture of 38.84 g. (0.2 mol. ) of dimethyl terephthalate, 5.84 g. (0.04 mol.) of dimethyl succinate, 69.1 g. (0.48 mol.) 1,4-cyclohexanedimethanol (70% trans isomer) and 9.0 g. (equivalent to about 0.07 mol. of monomer) of poly-N-tert-butylacrylamide [($\eta$) 0.41 in dimethyl formamide] was converted to a modified prepolymer by the procedure of Example 6. This prepolymer was further polymerized in the solid phase by heating at 235° C. at a pressure of 1.5 to 0.5 mm. for one hour. The resulting modified polyester contained 12% by weight of poly-N-tert-butylacrylamide based on nitrogen analysis. It dyed to deep shades in boiling aqueous dye baths containing an acid dye such as mentioned in Example 1.

*Examples 10–12*

These examples illustrate homogeneous mixtures prepared by the aforementioned process designated (2) wherein the mixtures are obtained by coprecipitation from a common solvent.

(10) 35 parts by weight of a polyester comprised from 5 moles of 4,4'-sulfonyldibenzoic acid, 1 mole of succinic acid and 6 moles of 1,5-pentanediol and having an inherent viscosity of 0.95 in 60–40 phenol-tetrachloroethane were dissolved in 315 parts by weight of hot tetrachyoroethane to give a viscous dope from which some of the polyester separated on slight cooling. With good stirring 3.5 parts by weight of poly-N-tert-butylacrylamide [($\eta$) 0.41 in dimethyl formamide] were added to the hot polyester solution. The resulting mixture was stirred and heated until the acrylamide polymer had dissolved to give a clear, homogeneous dope. This was poured with stirring into 600 parts by weight of hexane. The two polymers were thus coprecipitated in the form of large spongy globs which were broken up by agitation, filtered off with suction and washed well with hexane. Most of the residual solvent was removed by air drying. The remaining traces of solvent were removed by drying in a vacuum oven at 50° C. for 48 hrs. The modified polyester contained 0.96–1.06% by weight of nitrogen (equivalent to about 9.1% by weight of poly-N-tert-butylacrylamide) and had an inherent viscosity of 1.10 in 60–40 phenol-tetrachloroethane. Long, continuous monofilaments were obtained on spinning this modified polyester. These were smooth and uniform, had good color and could be cold drawn. Good dyeability was shown by this material when subjected to dyeing with acid and direct dyes such as previously mentioned.

(11) The procedure of Example 10 was repeated except that in place of the polyester and the polymeric acrylamide, there were substituted 50 parts by weight of a polyester from 3.0 moles of terephthalic acid, 1.0 mole of succinic acid and 4.0 moles of 1,4-cyclohexanedimethanol (70% trans isomer) which had an inherent viscosity of 1.25 in 60–40 phenol-tetrachloroethane, and 17 parts by weight of finely powdered poly-N-cyclohexylacrylamide [($\eta$) 0.62 in dimethyl formamide]. The modified polyester obtained was readily melt spun into long, continuous monofilaments that dyed well in boiling aqueous dye baths of acid dyes such as mentioned in Example 1.

(12) The procedure of Example 10 was repeated except that in place of the polyester and the polymeric acrylamide, there were substituted 50 parts by weight of a polyester comprised from 5 moles of terephthalic acid, 1 mole of glutaric acid and 6 moles of 1,4-cyclohexanedimethanol, and 5 parts by weight of a copolymer consisting of 90 mole percent of N-isopropylacrylamide and 10 mole percent of 2-methyl-5-vinylpyridine. The resulting modified polyester dyed to deep shades with acid and direct dyes. Similar results were obtained with a polyester substituted for the above comprised from 3 moles of terephthalic acid, 1 mole of glutaric acid and 4 moles of 1,4-cyclohexanedimethonol.

*Examples 13–19*

These examples illustrate homogeneous mixtures prepared by the aforementioned process designated (3) wherein the mixtures are obtained by addition of the polymeric acrylamide to the polyester melt and stirring until homogeneous.

(13) 30 parts by weight of a polyester comprised from 5 moles of 4,4'-sulfonyldibenzoic acid, 1 mole of terephthalic acid and 6 moles of 2,2-dimethyl-1,3-propanediol were reduced to a viscous melt by heating under a nitrogen atmosphere to 295° C. To this were added with stirring 5 parts by weight of poly-N-isopropylacrylamide. Stirring was continued until a substantially homogeneous mass was obtained. The resulting modified polyester contained about 14% of poly-N-isopropylacrylamide and was readily melt spun into fibers which showed excellent affinity for acid and direct dyes such as previously mentioned.

(14) The procedure of Example 13 was repeated except that a polyester comprised from 5 moles of 4,4'-sulfonyldibenzoic acid, 0.3 mole of sebacic acid and 5.3 moles of 1,6-hexanediol was used in place of the polyester of Example 13. The resulting modified polyester dyed well with acid and direct dyes.

(15) The procedure of Example 13 was repeated except that a polyester comprised from 1 mole of 4,4'-sulfonyldibenzoic acid and 1 mole of 1,8-octanediol was used in place of the polyester of Example 13. The resulting modified polyester showed improved dyeability in comparison to the same polyester containing no poly-N-isopropylacrylamide.

(16) A powdered (70 to 100 mesh) polyester comprised from 5 moles of 4,4'-sulfonyldibenzoic acid, 1.5 moles of suberic acid and 6.5 moles of 1,4-butanediol was blended thoroughly with 50% of its weight of finely powdered poly-N-phenylacrylamide [$(\eta)$ 0.45 in dimethyl formamide]. This mixture was melted and extruded into a rod ⅛-inch diameter, which was then cut into pellets. The pelleted modified polyester was remelted and the melt spun into fibers which, based on the analysis for nitrogen, consisted of 30–31% by weight of poly-N-phenylacrylamide, the remainder being the said unmodified polyester. These fibers dyed well with acid and direct dyes.

(17) 30 parts by weight of polyethylene terephthalate [$(\eta)$ 1.05 in 60–40 phenol-tetrachloroethane] were reduced to a viscous melt by heating under a nitrogen atmosphere to 270° C. in a metal bath. To the stirred melt, there were added 6 parts by weight of poly-N,N-dimethylacrylamide. Stirring was continued until a homogeneous mass was obtained. This material was melt spun into fibers which had a high tenacity, and which dyed readily in aqueous boiling dye baths containing an acid dye such as Wool Fast Blue BL (C.I. 833), Milling Red S.W.G. (similar to C.I. 430, Fast Red S (C.I. 176) to good, deep shades.

(18) 20 parts by weight of a polyester comprised from 5.0 moles of terephthalic acid, 1.0 mole of isophthalic acid and 6.0 moles of 1,4-cyclohexanedimethanol (about 70% of trans isomer) were heated under a nitrogen atmosphere to 290° C., whereupon a viscous melt was obtained. To the stirred melt were added 2 parts by weight of poly-N,N-dimethylacrylamide. Stirring was continued until a substantially homogeneous mass was obtained. This material was melt spun into fibers which dyed readily with acid and direct dyes.

(19) The procedure of Example 18 was repeated except that a polyester comprised from 6 moles of terephthalic acid, 0.5 mole of sebacic acid and 6.5 moles of 1,4-cyclohexanedimethanol (70% of trans isomer) was used in place of the polyester of Example 18. The resulting modified polyester dyed readily to excellent deep shades with acid dyes such as mentioned previously.

By following the procedures of the above examples, any other of the homogeneous mixtures coming within the aforementioned limits of the invention in the range of from 69 to 96 parts by weight of the polyester and from 31 to 4 parts by weight of the polymeric acrylamide can be prepared. All of the compositions of the invention can be melt spun into readily dyeable fibers which have good tenacity and elongation, good moisture absorption and are free from any tendency to segmentation. They can also be cast into flexible films by extrusion of the melt. Such films may be used as film supports for photographic layers. Also, if desired, various dyes, pigments, plasticizers, etc. can be incorporated into the melts prior to working into shaped articles.

What we claim is:

1. A process for preparing a homogeneous mixture of a linear polyester selected from the group consisting of (1) polyethylene terephthalate, (2) a linear polyester of equimolar proportions of 4,4'-sulfonyldibenzoic acid and a saturated, straight-chain alkanediol of 5 to 12 carbon atoms, (3) a linear polyester as defined by (2) above wherein the said acid is partially replaced by a saturated, straight-chain dibasic fatty acid of from 2 to 20 carbon atoms, (4) a linear polyester as defined by (2) above wherein the said acid is partially replaced by terephthalic acid, (5) a linear polyester of equimolar proportions of terephthalic acid and 1,4-cyclohexanedimethanol, (6) a linear polyester as defined by (5) above wherein the said acid is partially replaced by a saturated straight-chain dibasic fatty acid of 2 to 20 carbon atoms, and (7) a linear polyester as defined by (5) above wherein the said acid is partially replaced by isophthalic acid, and a polymeric acrylamide selected from the group consisting of (a) a homopolymer of a compound represented by the following general formula:

$$CH_2=CH-\overset{O}{\underset{\|}{C}}-N\diagup_R^R$$

wherein each R represents a member selected from the group consisting of an atom of hydrogen, an alkyl group of from 1 to 12 carbon atoms, a cyclohexyl group, a phenyl group and a benzyl group, and (b) a copolymer consisting of at least 60% by weight of a compound of the above general formula and the remainder of the polymer molecule of a different polymerizable compound selected from the group consisting of acrylonitrile, methacrylonitrile, styrene, α-methylstyrene, vinyl chloride, vinylidene chloride, an alkyl acrylate wherein the alkyl group contains from 1 to 4 carbon atoms, an alkyl methacrylate wherein the alkyl group contains from 1 to 4 carbon atoms, 2-methyl-5-vinyl pyridine, N-vinyl succinimide, N-vinyl phthalimide, N-vinyl pyrrolidone and vinylidene cyanide, which comprises heating from 69 to 96 parts by weight of the said linear polyester, at a temperature of from 250° to 350° C., under a nitrogen atmosphere, until the said polyester is substantially melted, adding thereto with stirring from 31 to 4 parts by weight of said polymeric acrylamide, and continuing to stir and heat at said temperature until a melted homogeneous mixture consisting of from 69 to 96% by weight of said linear polyester and from 31 to 4% by weight of said polymeric acrylamide is obtained.

2. The process of claim 1 wherein the said melted homogeneous mixture is pelletized.

3. A process for preparing a homogeneous mixture of polyethylene terephthalate and poly-N-tert-butylacrylamide which comprises heating from 69 to 96 parts by weight of polyethylene terephthalate, at 250° to 350° C., under a nitrogen atmosphere, until the polyethylene terephthalate is substantially melted, adding thereto with stirring, from 31 to 4 parts by weight of poly-N-tert-butylacrylamide, and continuing to stir and heat at said temperature until a melted homogeneous mixture consisting of from 69 to 96 parts by weight of polyethylene terephthalate and from 31 to 4 parts by weight of poly-N-tert-butylacrylamide is obtained.

4. A process for preparing a homogeneous mixture of a linear polyester of 5 moles of 4,4'-sulfonyldibenzoic acid, 1 mole of terephthalic acid and 6 moles of 2,2-dimethyl-1,3-propanediol and poly-N-isopropylacrylamide which comprises heating from 69 to 96 parts by weight of the said linear polyester, at 250° to 350° C., under a nitrogen atmosphere, until the polyester has substantially melted, adding thereto with stirring, from 31 to 4 parts by weight of poly-N-isopropylacrylamide, and continuing to stir and heat at said temperature until a melted homogeneous mixture consisting of from 69 to 96% by weight of said linear polyester and from 31 to 4% by weight of poly-N-isopropylacrylamide is obtained.

5. A process for preparing a homogeneous mixture of a linear polyester of 5 moles of terephthalic acid, 1 mole of isophthalic acid and 6 moles of 1,4-cyclohexanedimethanol and poly-N,N-dimethylacrylamide which comprises heating from 69 to 96 parts by weight of the said linear polyester, at 250° to 350° C., under a nitrogen atmosphere, until the polyester has substantially melted, adding thereto with stirring, from 31 to 4 parts by weight of poly-N,N-dimethylacrylamide, continuing to stir and heat at said temperature until a melted homogeneous mixture consisting of from 69 to 96% by weight of said linear polyester and from 31 to 4% by weight of poly-N,N-dimethylacrylamide is obtained.

6. A process for preparing a homogeneous mixture of a linear polyester of 6 moles of terephthalic acid, 0.5 mole of sebacic acid and 6.5 moles of 1,4-cyclohexanedimethanol and poly - N,N - dimethylacrylamide which comprises heating from 69 to 96 parts by weight of the said linear polyester, at 250° to 350° C., under a nitrogen atmosphere, until the polyester has substantially melted, adding thereto with stirring from 31 to 4 parts by weight of poly-N,N-dimethylacrylamide, continuing to stir and heat at said temperature until a melted homogeneous mixture consisting of from 69 to 96% by weight of said linear polyester and from 31 to 4% by weight of poly-N,N-dimethylacrylamide is obtained.

7. A process for preparing a homogeneous mixture of a linear polyester of 3.0 moles of terephthalic acid, 1.0 mole of succinic acid and 4.0 moles of 1,4-cyclohexanedimethanol and poly - N - tert - butylacrylamide, which comprises heating from 69 to 96 parts by weight of the said linear polyester, at 250° to 350° C., under a nitrogen atmosphere, until the polyester has substantially melted, adding thereto with stirring from 31 to 4 parts by weight of poly-N-tert-butylacrylamide, continuing to stir and heat at said temperature until a melted homogeneous mixture consisting of from 69 to 96% by weight of said linear polyester and from 31 to 4% by weight of poly-N-tert-butylacrylamide is obtained.

8. A homogeneous mixture of from 69 to 96% by weight of a linear polyester selected from the group consisting of (1) polyethylene terephthalate, (2) a linear polyester of equimolar proportions of 4,4'-sulfonyldibenzoic acid and a saturated, straight-chain alkanediol of 5 to 12 carbon atoms, (3) a linear polyester as defined by (2) above wherein the said acid is partially replaced by a saturated, straight-chain dibasic fatty acid of from 2 to 20 carbon atoms, (4) a linear polyester as defined by (2) above wherein the said acid is partially replaced by terephthalic acid, (5) a linear polyester of equimolar proportions of terephthalic acid and 1,4-cyclohexanedimethanol, (6) a linear polyester as defined by (5) above wherein the said acid is partially replaced by a saturated, straight-chain dibasic fatty acid of 2 to 20 carbon atoms, and (7) a linear polyester as defined by (5) above wherein the said acid is partially replaced by isophthalic acid, and from 31 to 4% by weight of a polymeric acrylamide selected from the group consisting of (a) a homopolymer of a compound represented by the following general formula:

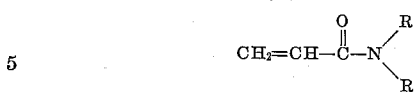

wherein each R represents a member selected from the group consisting of an atom of hydrogen, an alkyl group of from 1 to 12 carbon atoms, a cyclohexyl group, a phenyl group and a benzyl group, and (b) a copolymer consisting of at least 60% by weight of a compound of the above general formula and the remainder of the polymer molecule of a different polymerizable compound selected from the group consisting of acrylonitrile, methacrylonitrile, styrene, α-methylstyrene, vinyl chloride, vinylidene chloride, an alkyl acrylate wherein the alkyl group contains from 1 to 4 carbon atoms, an alkyl methacrylate wherein the alkyl group contains from 1 to 4 carbon atoms, 2 - methyl - 5 - vinylpyridine, N - vinyl succinimide, N-vinyl phthalimide, N-vinyl pyrrolidone and vinylidene cyanide.

9. A homogeneous mixture of from 69 to 96% by weight of polyethylene terephthalate and from 31 to 4% by weight of poly-N-tert-butylacrylamide.

10. A homogeneous mixture of from 69 to 96% by weight of a linear polyester of 5 moles of 4,4'-sulfonyldibenzoic acid, 1 mole of terphthalic acid and 6 moles of 2,2-dimethyl-1,3-propanediol and from 31 to 4% by weight of poly-N-isopropylacrylamide.

11. A homogeneous mixture of from 69 to 96% by weight of a linear polyester of 5 moles of terephthalic acid, 1 mole of isophthalic acid and 6 moles of 1,4-cyclohexanedimethanol and from 31 to 4% by weight of poly-N,N-dimethylacrylamide.

12. A homogeneous mixture of from 69 to 96% by weight of a linear polyester of 6 moles of terephthalic acid, 0.5 mole of sebacic acid and 6.5 moles of 1,4-cyclohexanedimethanol and from 31 to 4% by weight of poly-N,N-dimethylacrylamide.

13. A homogeneous mixture of from 69 to 96% by weight of a linear polyester of 3 moles of terephthalic acid, 1 mole of succinic acid and 4 moles of 1,4-cyclohexanedimethanol and from 31 to 4% by weight of poly-N-tert-butylacrylamide.

References Cited in the file of this patent
UNITED STATES PATENTS

| | | |
|---|---|---|
| 2,647,104 | Shivers | July 28, 1953 |
| 2,719,138 | Hagemeyer et al. | Sept. 27, 1955 |
| 2,776,271 | Coover et al. | Jan. 7, 1957 |
| 2,848,432 | Schulken et al. | Aug. 19, 1958 |

FOREIGN PATENTS

| | | |
|---|---|---|
| 610,140 | Great Britain | Oct. 12, 1948 |